(12) United States Patent
Lohmann et al.

(10) Patent No.: US 9,819,028 B2
(45) Date of Patent: Nov. 14, 2017

(54) ELECTRODE AND ENERGY STORE INCLUDING AN ELECTRODE

(75) Inventors: Timm Lohmann, Schwieberdingen (DE); Sebastian Maass, Renningen-Malmsheim (DE); Ralf Liedtke, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 227 days.

(21) Appl. No.: 14/238,596

(22) PCT Filed: Jun. 15, 2012

(86) PCT No.: PCT/EP2012/061394
§ 371 (c)(1),
(2), (4) Date: May 23, 2014

(87) PCT Pub. No.: WO2013/023809
PCT Pub. Date: Feb. 21, 2013

(65) Prior Publication Data
US 2014/0255801 A1 Sep. 11, 2014

(30) Foreign Application Priority Data
Aug. 15, 2011 (DE) .................. 10 2011 080 936

(51) Int. Cl.
*H01M 4/86* (2006.01)
*H01M 4/88* (2006.01)
(Continued)

(52) U.S. Cl.
CPC ......... *H01M 4/861* (2013.01); *H01M 4/8807* (2013.01); *H01M 4/8821* (2013.01);
(Continued)

(58) Field of Classification Search
CPC .. H01M 4/861; H01M 4/8807; H01M 4/8821; H01M 4/9016; H01M 8/0234; H01M 8/0239; H01M 12/08; Y02E 60/128
(Continued)

(56) References Cited

U.S. PATENT DOCUMENTS 3,935,029 A * 1/1976 Baker ................ D04H 1/42
429/530
4,269,691 A * 5/1981 Deborski ............ C25B 11/00
204/290.01
(Continued)

FOREIGN PATENT DOCUMENTS

EP   1 666 649      6/2006
JP   09-266001    * 10/1997  .............. H01M 8/02
(Continued)

OTHER PUBLICATIONS

Williford R E et al : "Air electrode design for sustained high power operation of Li/air batteries", Journal of Power Sources, Elsevier SA, CH, vol. 194, No. 2, Dec. 1, 2009, pp. 1164-1170, XP026499715, ISSN : 0378-7753, DOI : 10.1016/J.POWSOUR.2009.06.005 [retrieved on Jun. 11, 2009] "2.2 Dual pore system"; p. 1166, col. 1-col. 2, "Case 3"; p. 1168, col. 1.

*Primary Examiner* — Osei Amponsah
(74) *Attorney, Agent, or Firm* — Norton Rose Fulbright US LLP; Gerard Messina

(57) ABSTRACT

An electrode, in particular a gas diffusion electrode, for a metal-oxygen battery. To achieve an improved performance output, e.g., an improved energy density or an improved capacity, the electrode includes a porous carrier substrate on which a porous active material is situated, the electrode having a gradient of medium pore sizes between the carrier substrate and the active material. Also described is an energy store including the electrode as described.

14 Claims, 1 Drawing Sheet

(51) Int. Cl.
*H01M 12/08* (2006.01)
*H01M 8/0234* (2016.01)
*H01M 8/0239* (2016.01)
*H01M 4/90* (2006.01)

(52) U.S. Cl.
CPC ....... *H01M 8/0234* (2013.01); *H01M 8/0239* (2013.01); *H01M 12/08* (2013.01); *H01M 4/9016* (2013.01); *Y02E 60/128* (2013.01)

(58) Field of Classification Search
USPC .................................................. 429/405
See application file for complete search history.

(56) References Cited

U.S. PATENT DOCUMENTS

| | | |
|---|---|---|
| 2002/0107140 A1 | 8/2002 | Hampden-Smith et al. |
| 2004/0115516 A1* | 6/2004 | Miyake ............... H01M 4/8605 |
| | | 429/482 |
| 2011/0136024 A1 | 6/2011 | Seymour |

FOREIGN PATENT DOCUMENTS

| | | | |
|---|---|---|---|
| JP | WO 2010/131536 A1 * | 11/2010 | ............ H01M 12/06 |
| WO | 2010/131536 | 11/2010 | |
| WO | 2012/089658 | 7/2012 | |

\* cited by examiner

ELECTRODE AND ENERGY STORE INCLUDING AN ELECTRODE

FIELD OF THE INVENTION

The present invention relates to an electrode, such as, in particular, a gas diffusion electrode. The present invention relates in particular to a gas diffusion electrode for a metal-oxygen accumulator and a metal-oxygen accumulator including the gas diffusion electrode.

BACKGROUND INFORMATION

To reduce the emission, such as the local emission of motor vehicles, hybrid electric or purely electric drive concepts are being increasingly developed. The operation of electric machines in engine and generator modes requires an electrical energy store in the vehicle.

In order to improve the energy densities or the energy content of the energy store over conventional lithium ion batteries, for example, metal-oxygen batteries or metal-oxygen accumulators are promising. Here, lithium-air batteries and zinc-air batteries are known, using which high energy densities may already be obtained.

Common gas diffusion cathodes for metal-air batteries of this type have a current collector which may be an expanded aluminum metal or a porous nickel foam. A carbon/binder mixture may be introduced into the current collector as the active material. This may, for example, take place by pressing or penetration with the aid of ultrasound.

Nowadays, the gas diffusion electrode is thus prepared in most cases by applying a paste which may contain carbon, a binder, and additives. These pastes are applied to the nickel foam or alternatively to the expanded metal, e.g., aluminum. The nickel foam may, for example, be immersed into the paste for this purpose, the pores of the metal foam, in most cases in a magnitude of 0.5 mm to 1.0 mm, filling up under the ultrasound treatment. A carbon-based adhesive may be applied to coat expanded metal. The actual active paste is scraped onto a polymer foil and is thermally transferred into the expanded metal during a relaminating process. In this way, the active layer is distributed across the entire thickness in the case of a cathode structure produced in this manner. Therefore, the electrochemical oxygen reduction takes place at the oxygen/cathode boundary surface and also at the electrolyte/cathode boundary.

With the aid of conventional metal-oxygen accumulators, capacities in a range of 700 mAh/g to 800 mAh/g are achievable with reference to the active cathode mass including carbon, a binder, and other additives. However, drops in capacity, in some cases already after a few charging/discharging cycles, up to approximately 300 mAh/g and below, are often possible depending on the configuration of the battery.

SUMMARY OF THE INVENTION

An object of the present invention is an electrode, in particular a gas diffusion electrode for a metal-oxygen battery, including a porous carrier substrate on which a porous active material is situated, the electrode having a gradient of medium pore sizes between the carrier substrate and the active material.

In the sense of the present invention, an active material may in particular be understood to mean a material which may reversibly take up and release lithium ions, if the electrode according to the present invention is used in lithium-based accumulators, for example. The uptake may in this case take place, for example, through so-called intercalation or also through alloy formation or the formation of a metastable chemical compound. A corresponding activity with regard to other substances may in this case be present in other utilizations, in particular other accumulators.

In the sense of the present invention, a carrier substrate may be understood to mean a substrate, in particular, which, in particular, provides most of the mechanical stability and may be used as a base element, for example.

In the sense of the present invention, a porous active material or a porous carrier substrate may in particular be understood to mean an active material or a carrier substrate which in particular has open pores, i.e., is in particular configured to have an open porosity and is thus permeable to gas.

In the sense of the present invention, a gradient of medium pore sizes between the carrier substrate and the active material may in particular mean that the medium pore size of the active material is larger than the medium pore size of the carrier substrate. Here, the pore size may vary constantly, i.e., the pore sizes change continuously, or else an abrupt change may be involved. This may, for example, mean that the pore size in the active material and the pore size in the carrier substrate are uniform and the abrupt change is present at the boundary between the active material and the carrier substrate.

With the aid of the gradient according to the present invention of the pore sizes or the pore size distributions of the active material and the carrier substrate, an electrode structure is produced in which a gas-supplying layer, i.e., in particular the carrier material, is separated from a reaction layer or a reaction space, i.e., in particular the active material. This type of separation may in particular take place according to the present invention if the gas is able to flow through the smaller pores of the carrier substrate, but another reaction partner, such as the active material or a part thereof in particular, is not able to enter the pores of the carrier substrate. With the aid of such a separation of gas supply and reaction space, a gas is, for example, able to flow unimpededly from outside of the electrode into the carrier substrate and from there to the active material or into the active material. Due to the gradient of the medium pore sizes between the carrier substrate and the active material, a reaction of the active material essentially takes place only in the reaction space—which is situated in the active material and may be saturated with electrolyte, for example, if a liquid electrolyte is used—or in the pores of the active material.

According to the present invention, it may be prevented or significantly reduced or delayed that the gas access channels, which may be formed by the pores of the carrier substrate, are narrowed or completely clogged by reaction products during a charging or discharging process, for example. In other words, the gas access channels or pores in the carrier substrate may maintain their gas conveying properties, e.g., if used as a gas diffusion electrode in a metal-gas battery, during a complete charging cycle or discharging cycle. The oxygen supply at the reaction location may thus also be maintained for a longer period or even completely even in the case of increasing formation of reaction products, which may lead, in particular, to increasing usable discharging capacity with regard to the cathode coating. In this way, the utilization of the maximum cathode capacity may be improved and the cycle resistance may be extended.

In this way, a gain in cell capacity may therefore be implemented when active mass is used, since a clogging of the pores or of the gas access channels is delayed or prevented. Consequently, an optimal utilization of the present pore volume of the electrode is possible, a larger amount of reaction product being stored, thus enabling an energy-providing reaction for a longer period of time or to a greater extent. Thus, a significant increase in cell capacity may be achieved with the aid of an electrode according to the present invention.

Within the scope of one embodiment of the present invention, the carrier substrate may be liquid-impermeable. With the aid of a carrier substrate formed in this way, it may be particularly effectively prevented, even when a liquid electrolyte is used, that the latter enters the carrier substrate or the pores of the carrier substrate and carries out a reaction there with the active material or an active part of same by forming solid reaction partners, for example. In this embodiment, the gas access channels may thus be even better prevented from clogging and the performance of the electrode may be even further improved. A liquid-impermeability of the carrier substrate may in this case be implemented in many different ways. For example, the pore size may be set in such a way that it is too small for a liquid, in particular for a liquid electrolyte, to enter or to pass through.

Alternatively, permeability for liquids may be prevented by a suitable coating. Here, it may be particularly advantageous when the carrier substrate has a hydrophobic substance, i.e., for example, when a hydrophobic substance is situated in the pores of the carrier substrate. Within the scope of the present invention, this may in particular mean that the hydrophobic substance is situated in or applied to the inner walls of the pores in the carrier substrate. A liquid electrolyte may be particularly effectively prevented by the hydrophobic substance from entering the pores of the carrier substrate, for example. Polytetrafluoroethylene (PTFE) may, for example, be selected as a suitable material for coating and thus a desirable setting of the surface and thus liquid transportation properties of the carrier substrate.

Within the scope of another embodiment of the present invention, the carrier substrate may be formed or made of at least partially carbonized polymer fibers, depletion polymers, carbon nanotubes, carbon nanofibers and/or metal-plated polymers. In particular by using this type of carbon-based carrier instead of the conventional metallic carrier materials, a significant weight advantage may be achieved. In detail, by being able to dispense for the most part with conventional materials, e.g., metals such as aluminum or nickel, up to 70% in weight savings may be achieved according to the present invention, the weight savings referring to the entire electrode mass. In this way, the energy density may be increased, on the one hand, thus increasing the performance of an energy store which includes an electrode according to the present invention, for example. On the other hand, when using such an energy store as a traction battery in a vehicle, for example, any weight savings will reduce the energy consumption and thus, for example, increase the mileage of a vehicle which is equipped with such a traction battery.

Furthermore, according to the present invention, a reaction between the electrode material and the electrolyte may be prevented from taking place under certain circumstances and if a certain electrolyte is used, by using a carbon-based carrier substrate. Due to a reaction risk between the electrolyte and the electrode material reduced in this way, the electrolyte is freely selectable in wide areas, thus making possible an improved adaptability of the electrolyte and thus of the energy store according to the present invention to the desired area of application.

Moreover, the manufacture of the electrode according to the present invention may be improved. In detail, according to the present invention, the utilization of an adhesive may be dispensed with which is applied to an expanded metal, for example, prior to the application of the active material. An application of a functional cathode paste as an active mass, for example, to the carbon-based carrier substance is rather securely and reliably possible in one step and without a corresponding adhesive, since the carrier substrate itself acts as an adhesive. Relamination or ultrasound penetration is not necessary, for example. Consequently, a better reproducibility, in particular with regard to the layer thickness, adhesion, porosity, and homogeneity may thus result, for example. Phenomena such as demixing during drying may furthermore be avoided, since it is possible, for example, to work with an acetone-based paste, thus ensuring short drying times and also counteracting a demixing even without a special drying step.

According to the present invention, the costs for the adhesive as such as well as one working step may thus be saved, thus being able to create a manufacturing process for an electrode according to the present invention as well as the electrode itself in a more cost-effective manner.

Here, it may be that the carrier substrate is at least partially formed from carbonized polymer fibers such as polyacrylnitril, polyamid, polyurethane, polyester, polyterafluoroethelene, polystyrol, or cellulose or is at least made of these materials. Alternatively or additionally, it may be that the carrier substrate is formed at least partially from depletion polymers such as polymer fibers made of polyacetylene, polyaniline, polypyrrole, polythiophene, polyparaphenylene or is made of these materials. Alternatively or additionally, it may be that the carrier substrate is formed from carbon nanotubes or carbon nanofibers or is made of these materials. Alternatively or additionally, it may be advantageous when the carrier substrate is at least partially formed from metal-plated polymer fibers or is made of these materials. Metal-plated polymer fibers, e.g., polyamid, polyurethane, polyester, polyterafluoroethelene, may have a metal-plating of a suitable metal, e.g., aluminum (Al), copper (Cu), Nickel (Ni), palladium (Pd), platinum (Pt), or gold (Au). The metal may be applied with the aid of so-called "electroless" processes, using nickel as the coating material, for example. This process type is very common and not limited to nickel. Alternatively, thermal evaporation, sputter deposition or chemical vapor deposition (CVD) of suitable metals onto the provided fibers may be used.

The above-mentioned polymers may be processed particularly advantageously, for example, as nonwovens, fabrics, or papers. Here, they may form a structure which is stable, has suitable pores, and is furthermore suitable as a basis for an application of the active mass.

This embodiment is furthermore advantageous because the above-mentioned materials, in particular carbonized polymer fibers, for example, in most cases have a suitable mechanical stability in addition to good electrical conductivity. In this way, a current collector may be dispensed with, thus saving more costs.

Within the scope of another embodiment of the present invention, the carrier substrate may have a medium pore size in a range of $\geq 1$ μm to $\leq 100$ μm and/or the active material may have a medium pore size in a range of $\geq 2$ μm to $\leq 150$ μm. In this case, the pore sizes of the active layer and the carrier substrate should match one another to the extent that the desired gradient results. These types of pore sizes in the carrier substrate may effectively prevent, in the case of a good gas transportability, unwanted materials, e.g., electrolyte or active material, from entering the pores of the carrier substrate and thus solid reaction products from forming in the carrier substrate, thus clogging the pores or the gas access channels. In the active material, however, the desired reaction may take place between the gas and the active material, whereby an energy store which includes the electrode according to the present invention may provide electrical power, for example. Here, within the scope of the present invention, medium pore size distributions are meant in particular, since the pores, as described above, in the carrier substrate or in the active material may be uniform or else may vary in size in the case of a continuous pore size gradient, for example. Within the scope of the present invention, medium open pore sizes may be understood to mean in particular those which enable a gas transportation. Moreover, a porosity of $\geq 60\%$ to $\leq 80\%$ may be present in the carrier substrate, whereas a porosity of $\geq 70\%$ to $\leq 90\%$ may be suitable in the active material.

Within the scope of another embodiment of the present invention, the carrier substrate may have a thickness in a range of $\geq 50$ μm to $\leq 300$ μm and/or the active material may have a thickness in a range of $\geq 50$ μm to $\leq 100$ μm. Such thicknesses of the carrier substrate, for example, are, on the one hand, well suitable for a gas transportation and, on the other hand, offer a sufficient stability of the electrode according to the present invention. In relation to the thickness of the active material, the electrode according to the present invention offers furthermore in this embodiment a sufficient capacity and is still configurable in a very compact installation design, thus allowing for a variety of possible applications even in tight spaces.

If a porous carbon layer, in particular a carbon black layer, is situated between the carrier substrate and the active material, the adhesion of the active material to the carrier substrate may be further improved. In addition, this intermediate layer expands the possibilities of separating the active layer from the carrier substrate. Such a layer may in particular be advantageous when the carrier substrate is not carbon based as such. The carbon layer may, for example, have a thickness in a range of 10 μm. The carbon layer may also be porous in order to make possible a suitable gas transportation from the carrier substrate to the active material. Here, the carbon layer may, for example, have the porosity of the carrier substrate in order to avoid a reaction in the carbon layer. Furthermore, the carbon layer, in particular in the case of a continuous gradient, may have a porosity which is between that of the active material and that of the carrier substrate.

In another embodiment of the present invention, the carbon layer may have a hydrophobic material. A hydrophobic material may in this case prevent an electrolyte or an active material from entering or passing through the carbon layer, thus also preventing a clogging of the carbon layer. In this case, the carbon layer may be used as a kind of optional barrier layer in addition to a basis for the active material for the purpose of achieving a reaction and thus the formation of solid reaction products, for example, only taking place in the active material. A separation of gas access and reaction space is thus possible in an even more pronounced manner. The hydrophobic layer may be situated on the inner walls of the pores or gas passages of the carbon layer and be formed from polyterafluoroethelene (PTFE), for example. In this case, a hydrophobic material is not necessary in the carrier substrate, for example.

The present invention furthermore relates to an energy store, in particular a metal-oxygen battery, including an anode, a cathode, and an electrolyte situated between the anode and the cathode, the cathode being an electrode according to the present invention. With the aid of an energy store according to the present invention, the advantages mentioned with regard to the electrode may essentially be achieved, namely in particular a simplified manufacture, an improved energy density, as well as an increased capacity. As an example, metal-oxygen batteries are mentioned here, such as lithium-oxygen batteries or zinc-oxygen batteries, but also redox flow batteries or lithium-sulfur cells.

Further advantages and advantageous embodiments of the subject matters of the present invention are illustrated by the drawings and explained in the following description. It should be noted that the drawings are only descriptive in nature and are not intended to limit the present invention in any way.

DETAILED DESCRIPTION

Figure 1:
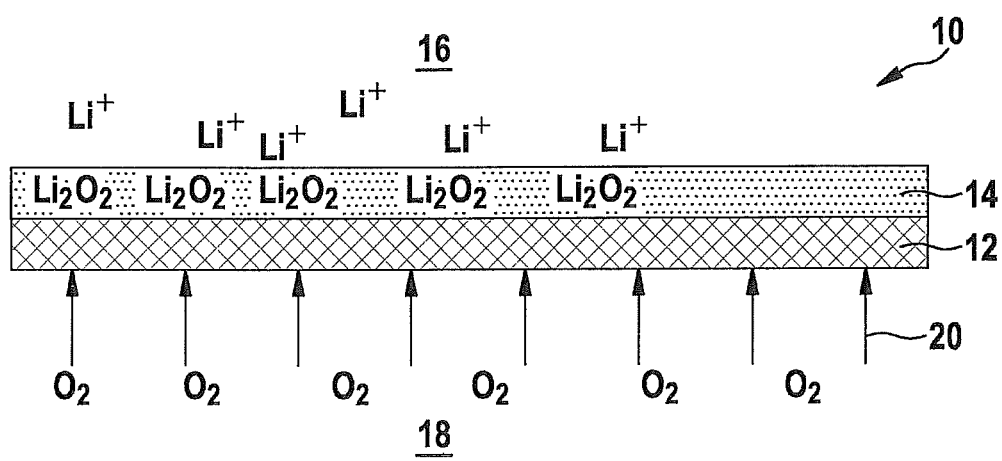
FIG. 1 shows a schematic drawing of one specific embodiment of an electrode according to the present invention.

FIG. 1 shows a schematic view of an electrode 10 according to the present invention. Electrode 10 is suitable, for example, to be used as a gas diffusion electrode in energy stores such as in metal-oxygen batteries. Lithium-oxygen batteries or also zinc oxygen batteries are cited here as an example. Electrode 10 is, however, not limited to the present examples, but may furthermore be used in liquid-based systems such as redox flow batteries or in lithium-sulfur cells. Other applications are also conceivable. Concrete exemplary areas of application may include batteries or accumulators for electric vehicles or also stationary applications such as a store for solar power.

Electrode 10 according to the present invention is described hereafter, but in a non-limiting manner, using the example of a lithium-oxygen battery, it being apparent to those skilled in the art that identical or similar advantages may also be achieved in the case of other applications.

According to FIG. 1, electrode 10 is thus a gas diffusion electrode for a metal-oxygen battery. Electrode 10 includes in this case a porous carrier substrate 12 which is permeable to gas. Carrier substrate 12 may, for example, be formed from a conventional metal. The carrier substrate 12 may be, however, at least partially formed from carbonized polymer fibers, depletion polymers, carbon nanotubes, carbon nanofibers and/or metal-plated polymers, or it may be made of the above-mentioned materials.

These types of polymer fibers may then be interwoven, interlaced, or glued together during the manufacture of an electrode 10 according to the present invention, thus resulting in a fabric, a nonwoven or paper, respectively. Subsequently, the structures thus obtained, for example when carbonized polymer fibers are used, may be carbonized completely during a thermal process, thus resulting in the carbonized polymer fibers. Carbonization may, for example, take place through suitable heating, e.g., in a temperature range of approximately 250° C. to 2000° C. in a vacuum or under a suitable non-oxidative gas atmosphere, e.g., nitrogen or argon. The advantage of nonwovens or papers is, in particular, that these materials have a suitable mechanical stability in addition to a good electrical conductivity.

With the aid of the above-described method, graphite fibers may be generated in the process which are situated in different directions in particular and which have a pore structure of high porosity of ≥60% to ≤80%, for example, and thus allow for good accessibility for gases. It is understood that the above-mentioned porosity values apply to the same extent to other materials of carrier substrate 12 and are settable via the manufacturing process, for example. The pore size may, for example, be set by suitable pressing or supercalendering of the completed layer or by selecting suitable conditions during carbonization, for example.

Carrier substrate 12 may in this case be liquid-impermeable in order to prevent liquid electrolyte or active material 14 from passing through. For this purpose, the surfaces and the liquid transportation properties of carrier substrate 12 may, for example, be set in a suitable manner by using a suitable surface treatment, e.g., using a hydrophobization by placing a hydrophobic substance such as polyterafluoroethelene.

According to the present invention, porous active material 14 is furthermore situated on carrier substrate 12, in particular directly on carrier substrate 12. Active material 14 may, for example, include carbon, a binder, e.g., polyvinylidenfluoride (PVDF), a cellulose-based binder, or polyterafluoroethelene (PTFE), as well as a catalyst, α-$MnO_2$ catalysts as an example for lithium-oxygen applications, or be made of the above-mentioned components.

According to the present invention, it is furthermore provided that electrode 10 has a gradient of the pore size distribution between carrier substrate 12 and active material 14. Consequently, carrier substrate 12 has smaller pore sizes than active material 14.

With reference to the porosity of carrier substrate 12 or of active material 14, carrier substrate 12 may have a pore size in a range of ≥1 μm to ≤100 μm. Furthermore, active material 14 may have a pore size in a range of ≥2 μm to ≤150 μm. In this way, suitable gas conveying conditions or reaction conditions may be created. With reference to the thickness, carrier substrate 12 may further have a thickness in a range of ≥50 μm to ≤300 μm and/or active material 14 may have a thickness in a range of ≥50 μm to ≤100 μm.

A carbon layer, in particular a carbon black layer, (not shown in FIG. 1) may be furthermore situated between carrier substrate 12 and active material 14. In this case, active material 14 is not situated directly on carrier substrate 12. This carbon layer may be used, for example, as a basis for an active layer which is formed from active material 14, for example. Furthermore, the carbon layer may prevent undesirable material, e.g., liquid or active material, from entering carrier substrate 12. For this purpose, the carbon layer or the carbon black layer may be provided with a hydrophobic material.

The advantages according to the present invention of the electrode are described in the following using the example of a lithium-oxygen battery. Such an energy store includes an electrode 10 according to the present invention, in particular as a cathode. On one side of electrode 10, an electrolyte 16 is situated which may be a 1 molar solution of lithium hexafluorophosphate ($LiPF_6$) in propylencarbonate and which is used as an example and is not limiting. On the side of electrolyte 16, which is opposite electrode 10, an anode, e.g., in particular a lithium anode, may furthermore be provided which is not shown in FIG. 1. On the side of electrode 10, which is opposite electrolyte 16, an oxygen atmosphere 18 is furthermore provided. Oxygen atmosphere 18 may, for example, be a defined space which surrounds the energy store and which has a gas access for ambient air, for example.

For example, solid reaction products, e.g., $Li_2O$ or $Li_2O_2$, may form during a discharging process of the lithium-oxygen battery as a result of a reaction between oxygen and active material 14, which may include lithium ions. With the aid of the embodiment according to the present invention of electrode 10, it is made possible that the oxygen flows or diffuses from oxygen atmosphere 18 through carrier substrate 12, as indicated by arrows 20, and the aforementioned reaction essentially takes place in the pores of active material 14 or at the boundary surface between active material 14 and carrier substrate 12 or the carbon layer.

Figure 2:
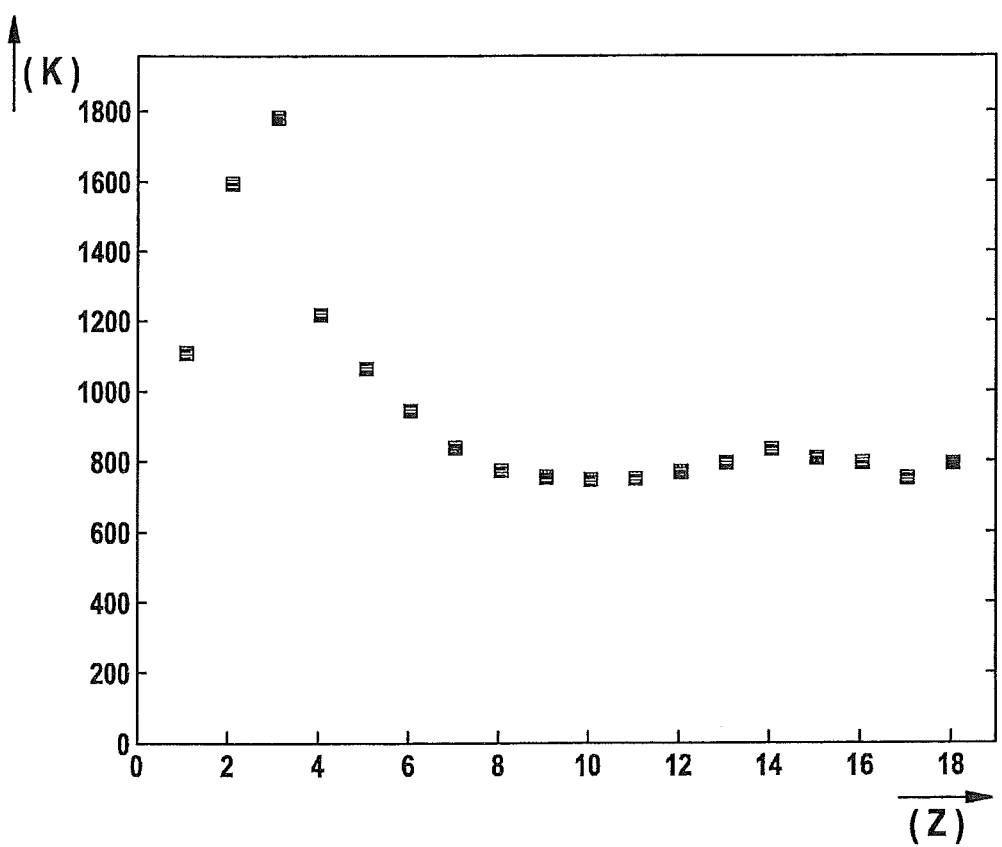
FIG. 2 shows a schematic diagram illustrating performance data of an electrode according to the present invention, as an example.

In FIG. 2, an exemplary cycle behavior is shown during a discharge of an exemplary lithium-oxygen cell having an electrode 10 according to the present invention. In detail, FIG. 2 shows a diagram which shows capacity (K) of an energy store of this type during a discharge in mAh/g, relating to the active cathode mass, i.e., in particular to active material 14, with reference to charging/discharging cycles (Z). Here, the measurements take place against metallic lithium as a half cell measurement using a 1 molar solution of lithium hexafluorophosphate in propylencarbonate as the electrolyte. FIG. 2 shows here that an exemplary capacity may reach 1800 mAh/g during the first cycles. It is to be understood in this case that capacities of this type were reached only as an example. Significantly higher values, which may reach a multiple of the above-mentioned value, are possible as a result of a suitable adaptation of the electrolyte, for example. For example, due to electrolyte oxidation and other aging mechanisms, the initial capacity may, for example, drop to values of approximately 800 mAh/g and remain at this level starting from the eighth cycle. If these values are compared to reference batteries which are based on a metal foam including active material, for example, a clear difference is apparent after several cycles both in the initial capacity and in the capacity level. It is, however, apparent to those skilled in the art that the performance data shown are only exemplary and obviously have room for improvement.

Another advantage according to the present invention may be seen in that electrodes 10, in particular based on a polymer carrier, may have an improved energy density with regard to the cathode material, i.e., active material 14, including carrier substrate 12. Thus, an exemplary square mass of the carbon carrier of approximately 10 mg/$cm^2$ may be considerably smaller—compared to exemplary metallic carriers, which may have a square mass of approximately 40 mg/$cm^2$—thus resulting in a positive effect on the energy density of an entire cell.

What is claimed is:

1. An electrode for a metal-oxygen battery, comprising:
   a porous carrier substrate on which a porous active material is situated, the carrier substrate is at least partially formed from carbonized polymer fibers; and
   a porous carbon layer that is situated between the carrier substrate and the active material;
   wherein the electrode has a gradient of medium pore sizes between the carrier substrate and the active material such that a medium pore size of the active material is larger than a medium pore size of the carrier substrate, and
   wherein pores of the porous carrier substrate have inner walls that are coated with a hydrophobic substance, the hydrophobic substance is polytetrafluoroethylene.

2. The electrode of claim 1, wherein the carrier substrate is liquid-impermeable.

3. The electrode of claim 1, wherein the carrier substrate is at least partially formed from at least one of depletion polymers, carbon nanotubes, carbon nanofibers and metal-plated polymers.

4. The electrode of claim 1, wherein the carbonized polymer fibers are at least partially formed from one of polyacrylnitril, polyamide, polyurethane, polyester, polyterafluoroethelene, polystyrol, and cellulose.

5. The electrode of claim 1, wherein at least one of the following is satisfied: (i) the carrier substrate has a medium pore size in a range of ≥1 μm to ≤100 μm; and (ii) the active material has a medium pore size in a range of ≥2 μm to ≤150 μm.

6. The electrode of claim 1, wherein at least one of the following is satisfied: (i) the carrier substrate has a thickness in a range of ≥50 μm to ≤300 μm; and (ii) the active material has a thickness in a range of ≥50 μm to ≤100 μm.

7. The electrode of claim 1, wherein the porous carbon layer has a hydrophobic material.

8. An energy store, comprising:
an anode;
a cathode; and
an electrolyte situated between the anode and the cathode;
wherein the cathode is an electrode for a metal-oxygen battery, including a porous carrier substrate on which a porous active material is situated, the carrier substrate is at least partially formed from carbonized polymer fibers and a porous carbon layer that is situated between the carrier substrate and the active material,
wherein the electrode has a gradient of medium pore sizes between the carrier substrate and the active material such that a medium pore size of the active material is larger than a medium pore size of the carrier substrate, and
wherein pores of the porous carrier substrate have inner walls that are coated with a hydrophobic substance, the hydrophobic substance is polytetrafluoroethylene.

9. The energy store of claim 8, wherein the energy store is a metal-oxygen battery.

10. The electrode of claim 1, wherein the electrode is a gas diffusion electrode.

11. The electrode of claim 1, wherein the porous carbon layer has a thickness of about 10 μm.

12. The electrode of claim 1, wherein the porous carrier substrate has a porosity in a range of ≥60% to ≤80%, and the porous active material has a porosity in a range of ≥70% to ≤90%.

13. The electrode of claim 1, wherein the porous carbon layer has a medium pore size that is the same as the medium pore size of the carrier substrate.

14. The electrode of claim 1, wherein the porous carbon layer has a medium pore size that is between the medium pore size of the carrier substrate and the medium pore size of the porous active material.

* * * * *